US009158534B2

(12) United States Patent
Gorelik et al.

(10) Patent No.: US 9,158,534 B2
(45) Date of Patent: Oct. 13, 2015

(54) SMART ENDPOINT ARCHITECTURE

(71) Applicant: WOLTERS KLUWER UNITED STATES INC., New York, NY (US)

(72) Inventors: Benjamin Gorelik, Buffalo Grove, IL (US); Arkady Katsnelson, Long Grove, IL (US); Anthony Oliveri, Greenlawn, NY (US); Yauheni Padaliak, Lesnoj (BY)

(73) Assignee: WOLTERS KLUWER UNITED STATES INC., New York City, NY (US)

( * ) Notice: Subject to any disclaimer, the term of this patent is extended or adjusted under 35 U.S.C. 154(b) by 85 days.

(21) Appl. No.: 13/844,717

(22) Filed: Mar. 15, 2013

(65) Prior Publication Data
US 2014/0282357 A1  Sep. 18, 2014

(51) Int. Cl.
*G06F 9/44* (2006.01)
*G06F 9/445* (2006.01)
(52) U.S. Cl.
CPC ... *G06F 8/71* (2013.01); *G06F 8/65* (2013.01)
(58) Field of Classification Search
CPC .................................... G06F 8/65; G06F 8/71
See application file for complete search history.

(56) References Cited

U.S. PATENT DOCUMENTS

| 6,560,633 | B1 | 5/2003 | Roberts et al. |
| 7,003,528 | B2 | 2/2006 | Dan et al. |
| 7,275,096 | B2 | 9/2007 | Green |
| 7,711,607 | B2 | 5/2010 | Agassi et al. |
| 7,827,527 | B1 | 11/2010 | Chiluvuri |
| 8,032,837 | B2 | 10/2011 | Bowman et al. |
| 8,082,294 | B2 | 12/2011 | Krahulec et al. |
| 8,121,826 | B1 * | 2/2012 | Neely et al. ...................... 703/14 |
| 8,180,828 | B2 | 5/2012 | Macken |
| 8,185,830 | B2 | 5/2012 | Saha et al. |
| 8,281,285 | B2 | 10/2012 | Ruehle |
| 2002/0066073 | A1 | 5/2002 | Lienhard et al. |
| 2002/0184610 | A1 * | 12/2002 | Chong et al. ................... 717/109 |
| 2005/0233767 | A1 * | 10/2005 | Ayyeppen et al. ............. 455/557 |
| 2006/0031187 | A1 * | 2/2006 | Pyrce et al. ........................ 707/1 |
| 2006/0294199 | A1 | 12/2006 | Bertholf |
| 2007/0179641 | A1 * | 8/2007 | Lucas et al. ....................... 700/83 |
| 2007/0204004 | A1 * | 8/2007 | Coyer et al. .................... 709/217 |

(Continued)

FOREIGN PATENT DOCUMENTS

WO   WO-2011104367 A2   9/2011

OTHER PUBLICATIONS

Microsoft SharePoint Online Developer Guide (Beta), Microsoft (2011).

(Continued)

*Primary Examiner* — Chameli Das
(74) *Attorney, Agent, or Firm* — Marshall, Gerstein & Borun LLP

(57) ABSTRACT

A network-based application development and distribution platform allows application developers to build, modify, and configure dynamic content applications (especially mobile applications) remotely, and without requiring manual software coding. Smart endpoints facilitate creation of distributable applications for multiple operating systems, form factors, access methods, and/or device types, while creating only a single product and associating the product with the desired endpoints corresponding to the operating systems, form factors, access methods, and/or device types. The platform also facilitates software updates, as updates can be made to the product once, rather than once for each version of the application.

30 Claims, 12 Drawing Sheets

(56) References Cited

U.S. PATENT DOCUMENTS

| | | |
|---|---|---|
| 2008/0059943 A1* | 3/2008 | Krevs et al. ............... 717/103 |
| 2008/0090513 A1* | 4/2008 | Collins et al. ............. 455/3.01 |
| 2008/0155037 A1 | 6/2008 | Sohoni et al. |
| 2009/0013267 A1 | 1/2009 | Cudich et al. |
| 2009/0187593 A1* | 7/2009 | Chen et al. ............... 707/104.1 |
| 2009/0228805 A1 | 9/2009 | Ruehle |
| 2009/0254572 A1 | 10/2009 | Redlich et al. |
| 2009/0259940 A1 | 10/2009 | Moraes |
| 2010/0091677 A1 | 4/2010 | Griff et al. |
| 2010/0199261 A1* | 8/2010 | Shenfield et al. ........... 717/107 |
| 2010/0287530 A1 | 11/2010 | MacLean et al. |
| 2010/0332617 A1 | 12/2010 | Goodwin et al. |
| 2011/0123972 A1 | 5/2011 | Friedman |
| 2011/0125834 A1 | 5/2011 | Macken |
| 2011/0145399 A1 | 6/2011 | Jeyapaul et al. |
| 2011/0161912 A1* | 6/2011 | Eteminan et al. ........... 717/101 |
| 2011/0283259 A1* | 11/2011 | Lawson et al. ............. 717/121 |
| 2012/0054278 A1* | 3/2012 | Taleb et al. ................. 709/204 |
| 2012/0210443 A1 | 8/2012 | Blaisdell et al. |
| 2012/0317171 A1 | 12/2012 | Lu |
| 2013/0007591 A1 | 1/2013 | Kothari et al. |
| 2013/0227683 A1 | 8/2013 | Bettini et al. |
| 2013/0268357 A1* | 10/2013 | Heath ....................... 705/14.53 |
| 2014/0098671 A1 | 4/2014 | Raleigh et al. |
| 2014/0282398 A1 | 9/2014 | Podolyak et al. |
| 2014/0282399 A1 | 9/2014 | Gorelik et al. |
| 2014/0344102 A1* | 11/2014 | Cooper ...................... 705/26.7 |

* cited by examiner

○ Kluwer NAVIGATOR

Home | Sources | Files | History | More

Sources

Product — Asser General Section. Product

Chapter I. The method of private law >

Chapter II. The boundaries of the right time and place >

Chapter III. The Civil Code and its history >

Asser General Section. §1 Introduction. The problem of legal interpretation

Asser General Section. Discourse

Asser General Section. §2 Right Inventive. law creation. law application

Asser General Section. Discourse

SMART ENDPOINT ARCHITECTURE

BACKGROUND OF THE DISCLOSURE

1. Field of the Disclosure

The disclosure relates generally to software development and, more particularly, to a hosted platform for developing and distributing mobile applications.

2. Brief Description of Related Technology

Mobile technology and, especially, mobile devices such as smart phones and tablets, are nearly ubiquitous. While it has not been unheard of in the past for multiple versions of any one software platform to be operating on different devices (e.g., where users have declined to upgrade and operating system to the most recent version), it is now commonplace—in part due to accelerating software design cycles—for several versions of a software platform to be in the marketplace at any give instant. Additionally, a given software platform may vary according to the device and/or the device manufacturer. Accordingly, applications designed for a software platform may require more than one version in order to account for different software platforms, different versions of software platforms, and/or different devices and/or form factors.

A variety of application development tools are available in the market. Generally, during application development an application developer executes a software development kit (SDK) application associated with a particular software platform (or associated with a particular version of a software platform) to create an application for the software platform. The SDK application generally operates on a computing device associated with the application developer. If the developer wishes to create applications for multiple versions of a platform, multiple platforms, or for different device types (e.g., smart phones and tablets), separate applications and development of applications are typically required. This labor is multiplied when a developer updates an application, as the update must be duplicated in each version of the application.

SUMMARY OF THE DISCLOSURE

In accordance with one aspect of the disclosure, a method includes storing on a server a library of configurable user interface components and functional components, and providing, via the server, an application hub hosting a developer interface accessible by an application developer via a network. The method also includes receiving, via the developer interface, a selection of one or more components from the library, the components selected for inclusion in a product, and receiving configuration data for one or more of the selected components. Additionally, the method includes displaying, via the developer interface, a preliminary occurrence of the product, associating the product with any of a plurality of endpoints, receiving from the application developer a request for the product, and providing the product to the application developer according to any one or more of the plurality of endpoints, according to an endpoint request received from the application developer.

In accordance with another aspect of the disclosure, a software development and distribution platform, hosted on a server, includes a library of configurable user interface components and functional components, and an application hub hosting a developer interface accessible by an application developer via a network. The application interface allows the application developer to select one or more components from the library for inclusion in a product, and to configure each of the user interface components and functional components in the product. The application interface also allows the application developer to display a preliminary occurrence of the product and associate the product with any of a plurality of endpoints. The application hub is further operable to receive from the application developer a request for the product, and to provide the product to the application developer according to any one or more of the plurality of endpoints, according to an endpoint request received from the application developer.

In accordance with yet another aspect of the disclosure, a computer-readable storage medium stores instructions, executable by a processor, to cause the processor to retrieve one or more components from a library of configurable user interface components and functional components and provide to an application developer, via a network, a developer interface. The instructions are also operable to cause the processor to receive, via the developer interface, a selection of one or more components from the library for inclusion in a product. Further, the instructions are operable to cause the processor to receive configuration data for one or more of the selected components, display, via the developer interface, a preliminary occurrence of the product, and associate the product with any of a plurality of endpoints. Further still, the instructions are operable to cause the processor to receive from the application developer a request for the product, and to provide the product to the application developer according to any one or more of the plurality of endpoints, according to an endpoint request received from the application developer.

BRIEF DESCRIPTION OF THE DRAWING FIGURES

For a more complete understanding of the disclosure, reference should be made to the following detailed description and accompanying drawing figures, in which like reference numerals identify like elements in the figures, and in which:

FIG. 11 is a screen shot of an example client-facing application; and

FIG. 12 is a screen shot of an example client-facing application.

Figure 1:
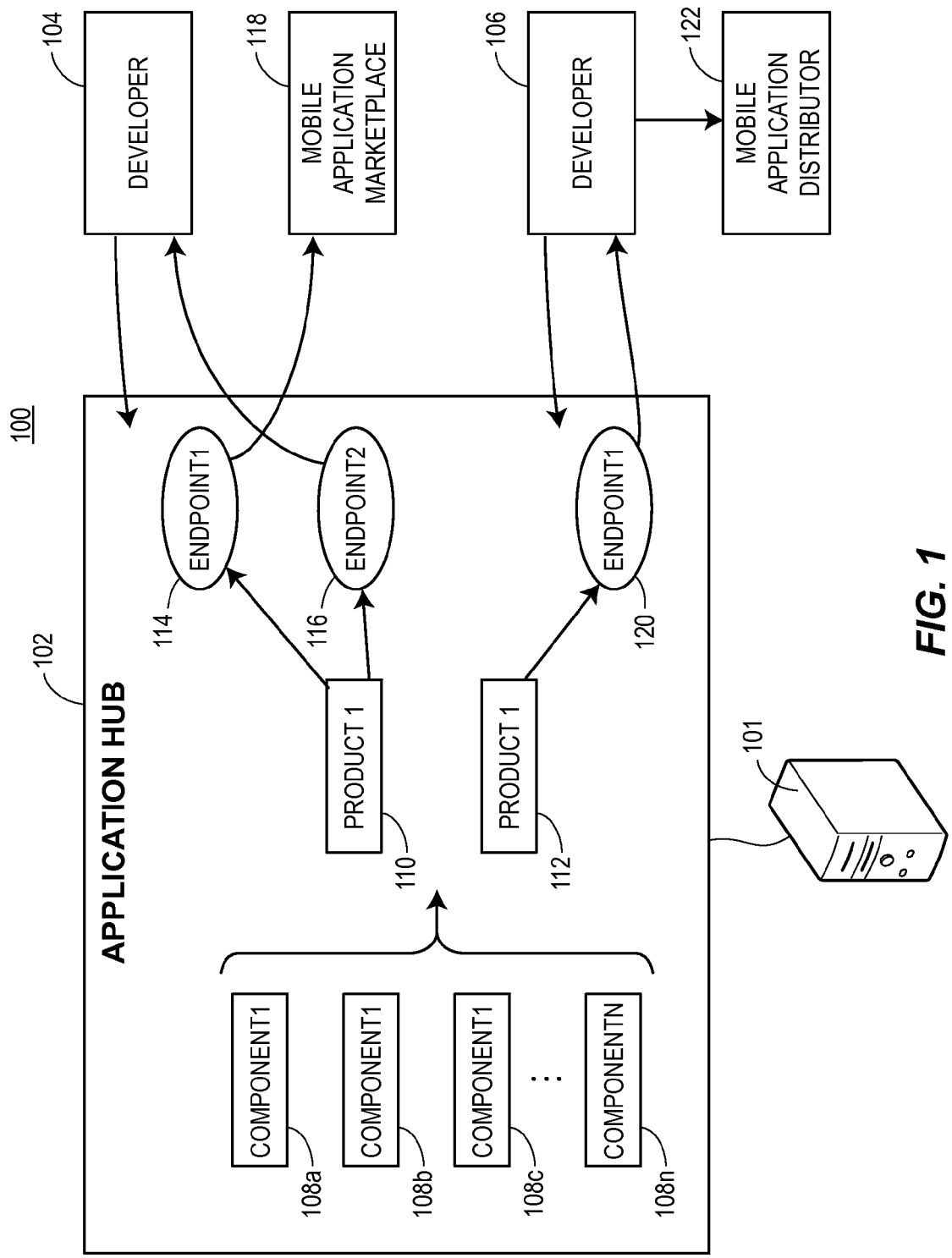
FIG. 1 illustrates a cloud-based implementation of an application development and distribution platform.

While the disclosed methods and apparatuses are susceptible of embodiments in various forms, there are illustrated in the drawing (and will hereafter be described) specific embodiments of the invention, with the understanding that the disclosure is intended to be illustrative, and is not intended to limit the invention to the specific embodiments described and illustrated herein.

DETAILED DESCRIPTION OF PREFERRED EMBODIMENTS

Generally, techniques described herein provide a network-based application development platform that allows application developers to build, modify, and configure dynamic content applications remotely, and without necessarily requiring manual software coding. The platform may be cloud-based and accessible through a web browser interface. In various examples, the development platform is described in the context of mobile application development, from which users, whether external customers, internal business units at a corporate enterprise, or otherwise, are able to access a server hosted, cloud-based user interface (UI). The UI provides customers a readily accessible interface through which to build applications containing dynamic components, for example, components written in HTML5, Cascading Style Sheets (CSS), and JavaScript, using, in some examples, an intuitive drag and drop interface. In other examples, the UI provides customers a scripting language interface that provides access to the dynamic components, an interface such as one providing JavaScript code access.

To provide an example of the present techniques, FIG. 1 illustrates a cloud-based implementation of an application development and distribution platform 100. The platform 100 includes an application hub 102 hosted on a cloud-based server 101 that provides access to any number of authorized application developers, of which two are shown in the illustrated example, 104 and 106. These application developers 104 and 106 may represent individual application developers, service subscribers, customers, or enterprises, end users, etc. The application developers 104 and 106 are able to access the platform 100 over a wired or wireless communication network and, more specifically, at least in some examples, over an Internet connection.

The platform 100 contains a library of components 108a-108n that serve as building blocks of application development. The components 108a-108n, as discussed further herein, may be of numerous different types, including user interface components that provide for accepting user input and display of information to the user and functional components that provide for the manipulation of data. In some examples, the user interface components are touch based user interface components, for example, to allow for user input and display on touch-based hardware. In some examples, the user interface components are mobile user interface components, to allow for display on mobile hardware. Example functional components include any number of HTML5, JavaScript, CSS, Java applets, iFrame, Ajax, jQuery, and the YUI library or resources that are capable of manipulating data in XML, JSON/JSONP, or any other compatible format. Examples of user interface components include, but are not limited to, search boxes, views (including image, map, web, document, page, scroll, split, table, cell, and text views, etc), pick lists, radio buttons, sliders, steppers, switches, text fields, buttons, checkboxes, bars (including status, navigation, tab, toolbar, progress, scope, and search bars), tables, scroll wheels, pick wheels, alerts, action sheets, software keyboards, labels, page controls, refresh controls, and segment controls.

Components are selectable, by application developers, using a management portal UI provided by the platform 100, and configurable both via a management portal GUI and by editing the underlying JavaScript component code. Structurally, components serve, at least partially, as the building blocks of products, of which two products 110 and 112 are shown in the illustrated example. Products and packages are customizable templates for applications and may contain page layouts, organizational layouts, application styles, themes, and colors, internationalization and localization configurations, application language configurations, and pre-configured components. Products contain a display name and product ID and may be associated with one or more endpoints.

The platform 100 provides application developers a UI and grants them access to the library of components 108a-108n, from which the application developer is able to select one or more components for inclusion into one or more of the products or packages. The application developer can configure the components for inclusion in the respective products and view, in real-time, a preliminary occurrence (i.e., a preview) of the product providing the developer a visual indication of the changes made, including changes to one component that affect another component within the product.

From product development, a developer is able to associate the products with an one or more endpoint applications, which represent the final application build. In FIG. 1, for example, application developer 104 accesses the application hub framework 102, selects a product 110, and configures product 110 to contain any of a plurality of the components 108a-108n. Once configured, the developer 104 associates the product 110 with two different endpoint applications 114 and 116, which will each have the defined template layout, etc. of the product 110, but which will be configured to different target users and/or client hardware configurations. Each endpoint 114, 116 may present a different instantiation of the application, for example where each endpoint application is targeted to a different mobile operating system platform (e.g., iOS available from Apple, Inc., Android available Google Inc., Windows Phone available from Microsoft Corp., BlackBerry OS from BlackBerry Ltd.). An endpoint may be configured as a routing endpoint that is capable of determining which instantiation of the application is most appropriate to respond to a particular user request, such as, for example, by checking the user-agent on an incoming HTTP request and routing that request accordingly. Some endpoint applications could be targeted as web-based applications, while others may be targeted to proprietary platforms. In any event, in the illustrated example, from the single product 110, the application developer 104 is able create the endpoint application 114, which the hub framework 102 publishes to a mobile marketplace 118, such as an on-line mobile "app store," like the online Apple App Store or the Google Play application store, from which end customers may purchase and/or download the published application 114. The application developer 104 has also created the endpoint application 116, which is sent back to the application developer 104 directly, for selective distribution, instead of to a mobile marketplace.

Similarly, in another illustrated example, the application developer 106 has configured product 112, of various of the components 108a-108n, and associated that product 112 with a single endpoint application 120, which is then provided back to the application developer 106 and distributed directly by that developer through a mobile application distributor 122, such as an website, intranet, extranet, or any other communications network.

As illustrated, the present techniques provide an application development platform from which a single coded buildup, e.g., a single product formed of components and component packages, may be used to develop multiple application instantiations, thus greatly reducing software development and maintenance time and costs. This gives developers greater flexibility and control over application development, as well as better control over product delivery cycles.

Figure 2:
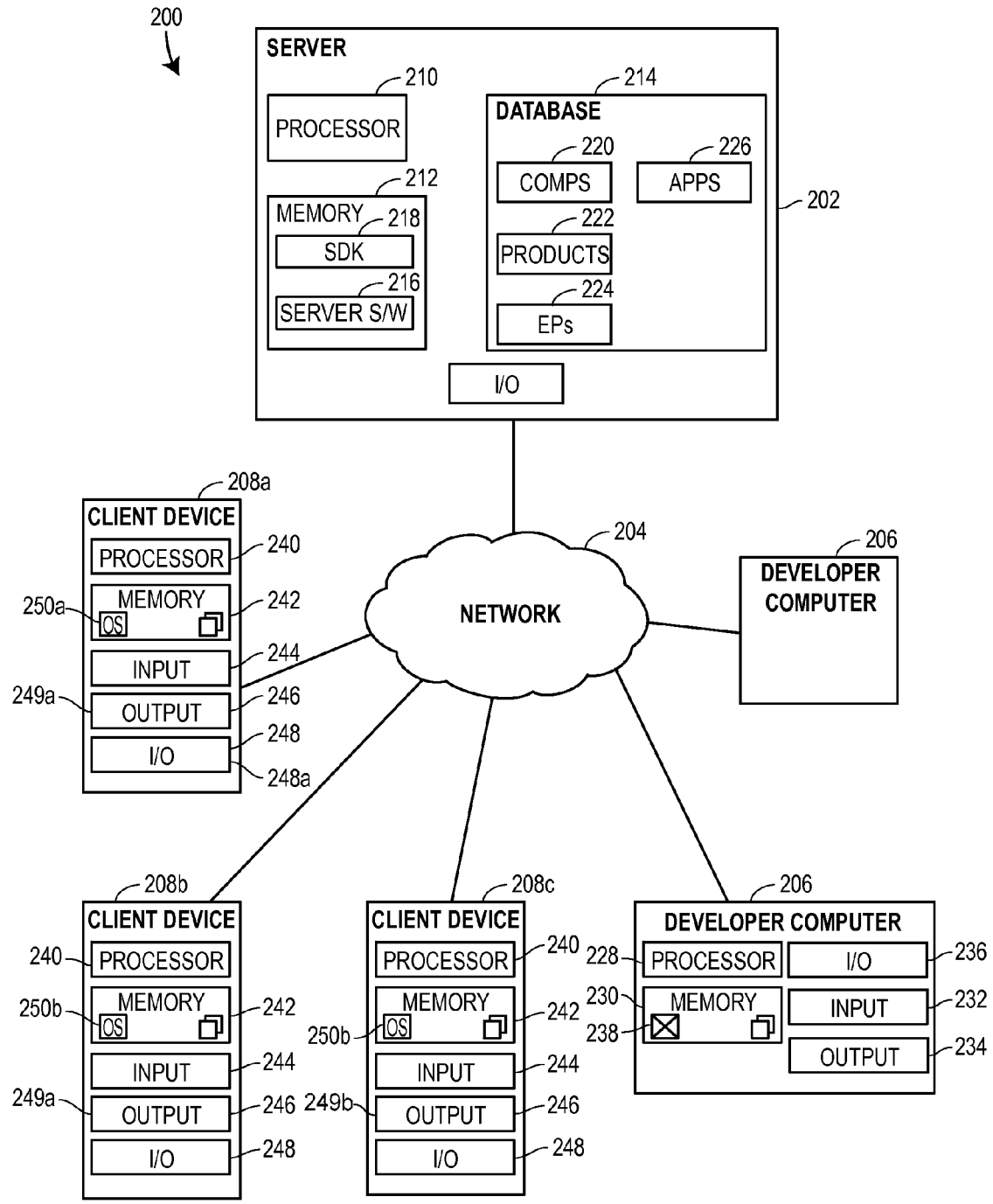
FIG. 2 is a block diagram depicting an exemplary cloud computing environment in which the development and distribution platform may operate.

FIG. 2 illustrates a block diagram depicting a cloud computing environment 200 or other distributed computing environment in accordance with an embodiment of the platform 100. The cloud computing environment 200 includes one or more servers 202 communicatively coupled via a network 204, such as the Internet, to one a plurality of developer computing devices 206, which may be used by the application developers 104 and 106, for example, and to a plurality of client devices 208a-208c. While FIG. 2 depicts only a single server 202, it will be appreciated that any number of servers 202 may be part of the cloud computing environment 200, and that the number of servers 202 participating in the cloud computing environment 200 need not be constant.

Additionally, while two developer computing devices 206 and three client devices 208a-208c are depicted in FIG. 2, any number of computing devices and any number of client devices may be communicatively coupled to the server(s) 202 via the network 204, as is generally understood with respect to Internet cloud computing systems operating in accordance with the Software-as-a-Service (SaaS) model. Further, each of the developer computing devices 206 and the client devices 208 may be coupled to the network 204 via wired or wireless communication channels including, by way of example and not limitation, wired Ethernet connections, IEEE 802.11 wireless protocols ("Wi-Fi"), wireless telephony links, and the like.

The server 202 includes a processor 210, a memory device 212, and a database 214. As is generally understood, the processor 210 is communicatively coupled to the memory device 212 and the database 214, and operates to execute machine-readable instructions stored on the memory device 212. As used herein, the phrase "machine-readable instructions" indicates compiled (or compilable) instructions, scripting languages (e.g., JavaScript), or any other set of instructions operable to cause a processor to perform one or more operations. In some embodiments, the instructions are parsed by an interpreter and the interpreter causes the processor to perform the operations. The machine-readable instructions stored on the memory device 212 of the server 202 include at least a server module 216 and a software development module (or software development kit—"SDK") 218. Of course, other routines and/or modules, such as operating systems, device drivers, and the like, may also reside on the memory device 212. In some embodiments, such as that just described, the processor 210 is a general purpose processor programmed by the machine-readable instructions stored on the memory device 212 to perform as a special-purpose processor. In other embodiments, however, the processor 210 may be a special purpose processor designed to perform the tasks specified by the computer-readable instructions. Where the processor 210 is a special purpose processor, the processor 210 may be permanently configured according to the computer-readable instructions (e.g., an application specific IC (ASIC)), may be semi-permanently configured according to the instructions (e.g., a field programmable gate array (FPGA)), etc.

In any event, the processor 210 may operate, according to the computer readable instructions, on data stored in the database 214. The data stored in the database 214 may include any type of data, but in at least one embodiment, the database 214 stores at least data for implementing and using the software development module 218. For example, and as will be described in detail below, the database 214 may store a set of components 220 (such as the components 108a-108n) for use by a developer using the software development module 218 to create one or more client applications. The components 220 include, in embodiments, user-interface components (e.g., operable in combination to specify and create a user interface) and functional components (e.g., operable to perform a function with data and/or instructions received from a user via the user-interface).

The database 214 may also store products 222 (e.g., the products 110 and 112). The products 222 may be combinations of functional and user-interface components 220, configured in some embodiments as modules that provide basic (or advanced) functionality. In some embodiments, the products 222 may also include products that are purely combinations of functional components 220 and/or products 222 that are purely combinations of user-interface components 220. Additionally, multiple products 222 may be combined to create other products 222, and products 222 may be configured/configurable to allow a developer, via the software developer module 218 to modify, customize, and/or revise the products 222. In some embodiments, the products 222 may serve as templates from which developers may create configured or configurable instantiations of a product.

The database 214 may also store a number of endpoints 224. As will be described in detail below, the endpoints 224 allow an application developer using the software development module 218 to produce, in an automated or semi-automated manner, multiple application instances (e.g., 114 and 116), for example for different platforms, types of users, types of form factors of devices, from a single product 222 or set of products 222. Of course, the database 214 may also store application instances 226 output by the software development module 218 according to the endpoints 224.

Each of the developer computing devices 206 includes a processor 228, a memory sub-system 230 (including volatile and non-volatile memory), one or more input devices 232, one or more output devices 234, and an input/output subsystem 236 for communicating with other devices (e.g., with the server 202 via the network 204). As should be understood, the processor 228 operates to execute machine-readable instructions stored in the memory subsystem 230. The machine-readable instructions may include a routine 238 for accessing, via the network 204, the software development module 218 operating on the server 202. The routine 238 may, in an embodiment, be a web browser. In another embodiment, the routine 238 may be an application dedicated to accessing the software development module 218. The machine-readable instructions may further include other routines or modules (e.g., an operating system, other software applications, etc.). The input device 232 and output device 234 may be any known or future input and output devices. For example, the input device 232 may be a keyboard, a pointing device (e.g., a mouse or trackpad), a touch-sensitive display, a microphone, etc. Likewise, the output device 234 may include a display device.

Similarly, each of the client devices 208a-208c includes a processor 240, a memory sub-system 242 (including volatile and non-volatile memory), one or more input devices 244, one or more output devices 246, and an input/output subsystem 248 for communicating with other devices (e.g., with the server 202 via the network 204). The processor 240 operates to execute machine-readable instructions stored in the memory subsystem 242.

The machine-readable instructions stored in the memory subsystem 242 of each of the client devices 208a-208c may include an operating system and one or more other software applications. The operating system on each of the devices 208a-208c need not be identical. In the client device 208a, for example, the memory subsystem 242 is depicted as including a first operating system 250a, while in the client devices 208b, for example, the memory subsystem 242 is depicted as including a second operating system 250b. That is, client devices using different operating systems may mutually communicate with the server 202 via the network 204 to access applications (e.g., applications 226) created by developers using the software development module 218. The client device 208a, for example, executing the operating system 250a, may access a first one of the applications 226 created specifically for the operating system 250a, while the client devices 208b and 208c may access a second one of the applications 226 created specifically for the operating system 250b.

Likewise, each of the client devices 208a-208c may implement different hardware. For example, the client devices 208a and 208b may each be smart phone devices, implementing a similarly-sized display 249a (e.g., a 4-inch display), while the client device 208c may be a tablet device implementing a different size display 249b from the client devices 208a and 208b (e.g., a 10-inch display). Client devices having similar hardware configurations (e.g., the client devices 208a and 208b) may access similar ones of the applications 226 (though the applications 226 may be different if the operating systems 250 are different, as described above). By the same token, client devices having different hardware configurations (e.g., the client devices 208b and 208c) may access different ones of the applications 226, even though the client devices implement the same operating system 250b.

Figure 3:
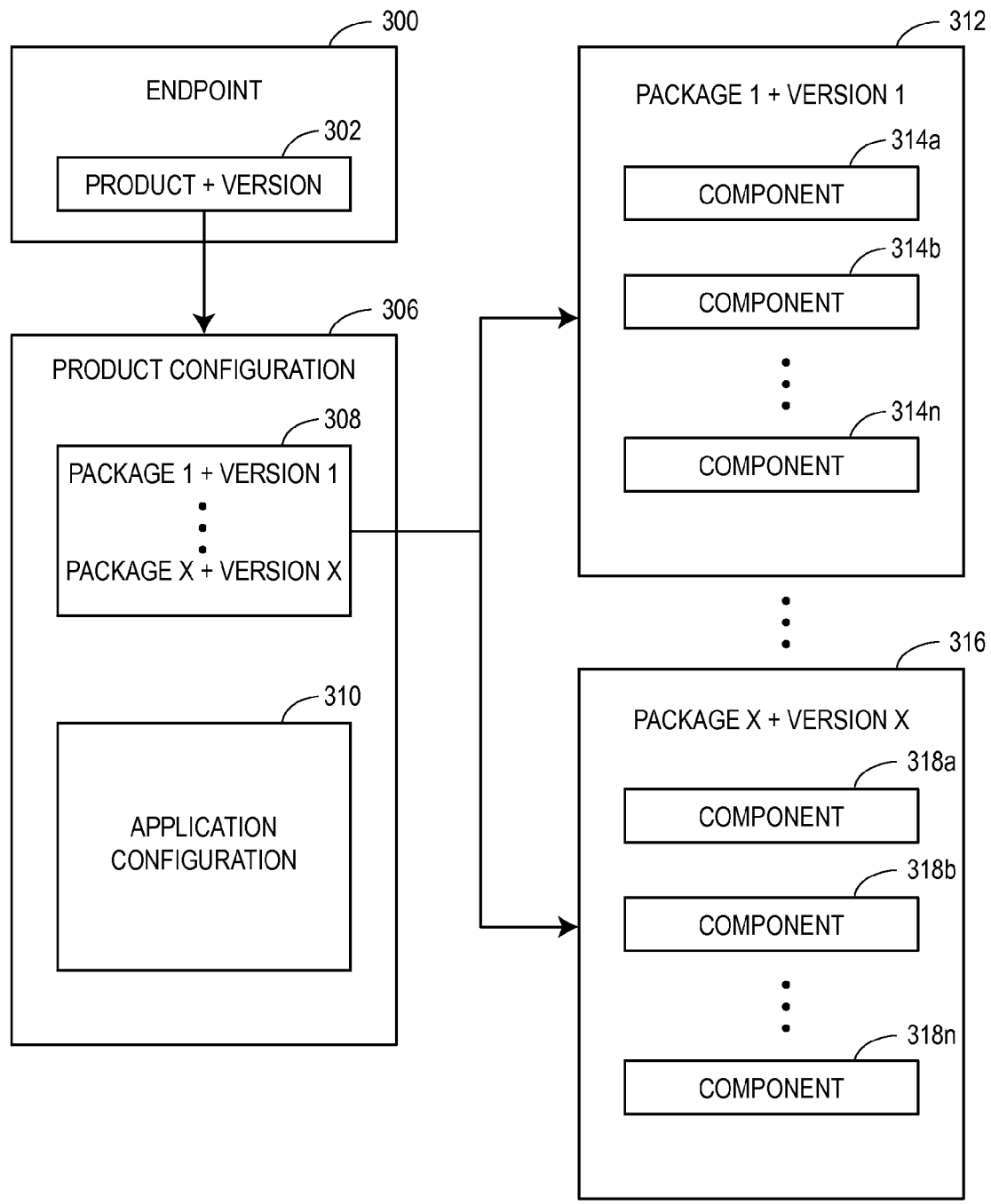
FIG. 3 illustrates a relationship between endpoints, products, packages, and components in accordance with the present description.

FIG. 3 illustrates a relationship between endpoints, products, packages, and components in accordance with an example implementation of an application buildup process that may be executed using the cloud computer environment 200 of FIG. 2. In the illustrated example, each Endpoint instantiation 300 is associated with a Product instantiation 302, also termed a product version. In some examples, products are configured by populating them with individual components; in other examples, products are formed of packages of components. In the illustrated example, a Product Configuration instantiation 304 contains one or more Packages 306, i.e., Package 1-Package X in the illustrated example. The Product Configuration instantiation 304 also includes an Application Configuration instantiation 310. Each of the Packages 308 contains plurality of components, which may have been previously associated with the packages or which may be associated with the packages by the developer during an application buildup process. In the illustrated example, Package 312 includes a plurality of Components 314a-314n; and Package 316 includes Components 318a-318m. The Endpoint 300, therefore, built of these constituents can be published as an endpoint application for distribution to a mobile user.

In an example buildup process, an application developer accesses the application hub of FIG. 1 and selects one or more endpoints for operation. The developer may then initiate operation of a buildup service that reads macros specified in the selected endpoint in order to substitute them later into the application configuration instantiation. These macros allow the application hub to have multiple endpoints pointed to the same product version but configured for different environments. The service then finds requested product version configurations and related static resources like images, HTML files, CSS, etc. The service finds package versions specified in a product configuration and retrieves related JavaScript files, where every package contains JavaScript files for each corresponding component of that package. The Service reads the application configuration from product configuration substituting macros specified in the endpoint. The result of these operations is a list of JavaScript files (e.g., for each component), static files, and an application configuration. The service then, in some examples, combines all JavaScript files into single one, minifies it (configurable), compresses it (configurable), creates cache manifest (configurable), caches it (it's possible to use Azure CDN), and minifies CSS (configurable). The service then returns back HTML with Link to the JavaScript file, Link to CSS, and Auto loaded script that calls the respect application component passing application configuration as a parameter.

Figure 4:
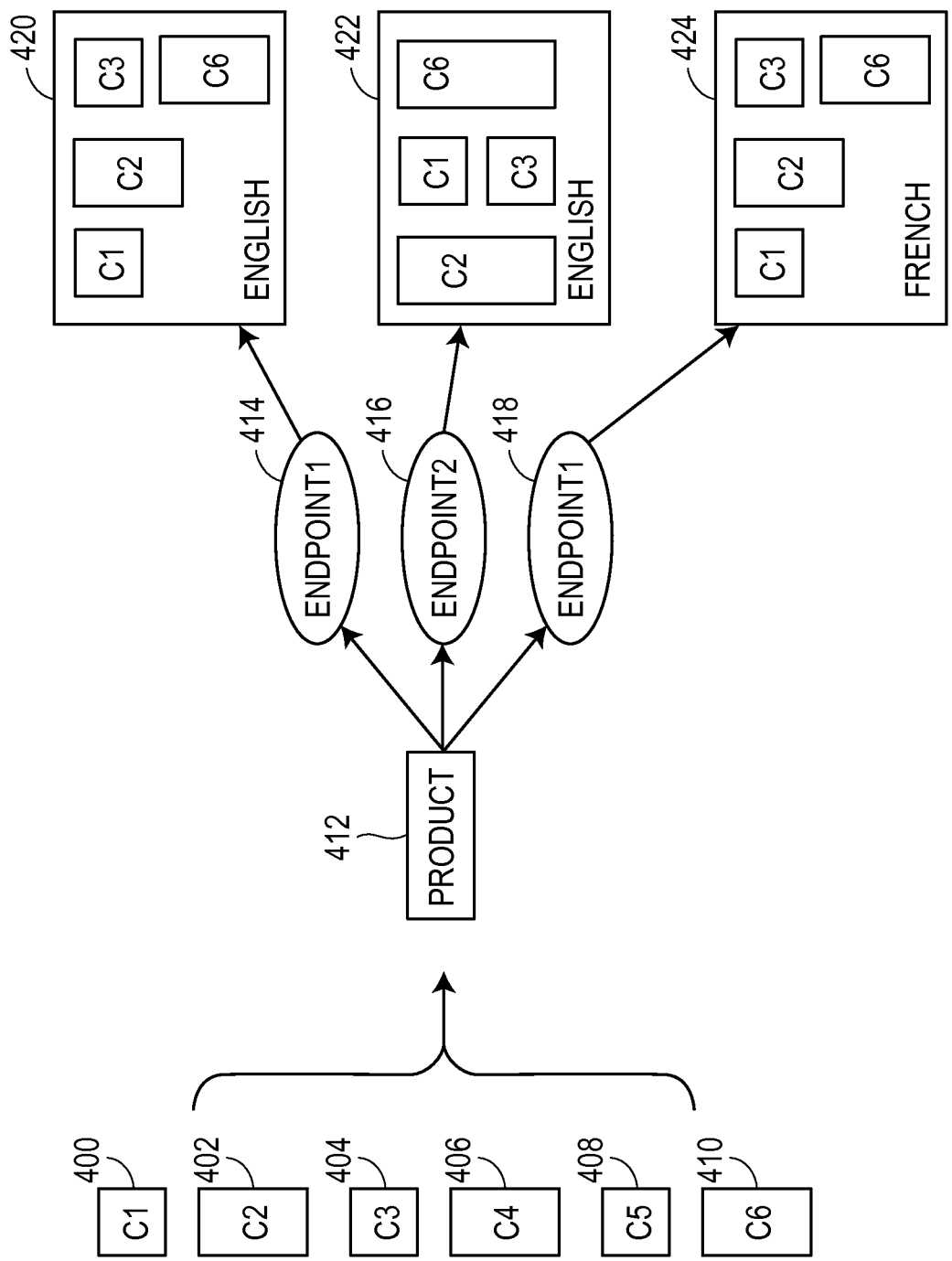
FIG. 4 illustrates another relationship between components, a single product, and multiple endpoints.

FIG. 4 illustrates the relationship between components, a single product, and multiple endpoints, in accordance with an example implementation that has been used to form a plurality of different endpoint applications. Components 400-410 are stored in an accessible library, either individually as shown or in other examples grouped within packages. In the illustrated example, an application developer, accessing the cloud environment and more specifically an application hub contained therein, has selected components 400, 402, 404, and 410 to form into a product 412. That product 412 is then associated with three different previously associated endpoint applications 414, 416, and 418, each having a different layout for a corresponding mobile application instantiation, shown in the form of three different screenshots 420, 422, and 424, respectively. In the illustrated example, screenshots 420 and 422 are somewhat similar and differ in the positioning of the components configured into the product 412, where both use the same language (e.g., English) for the page layout. Screenshots 420 and 424 have the same positioning of components, but for the latter endpoint 418, the resulting application uses a second language (e.g., French).

Figure 5:
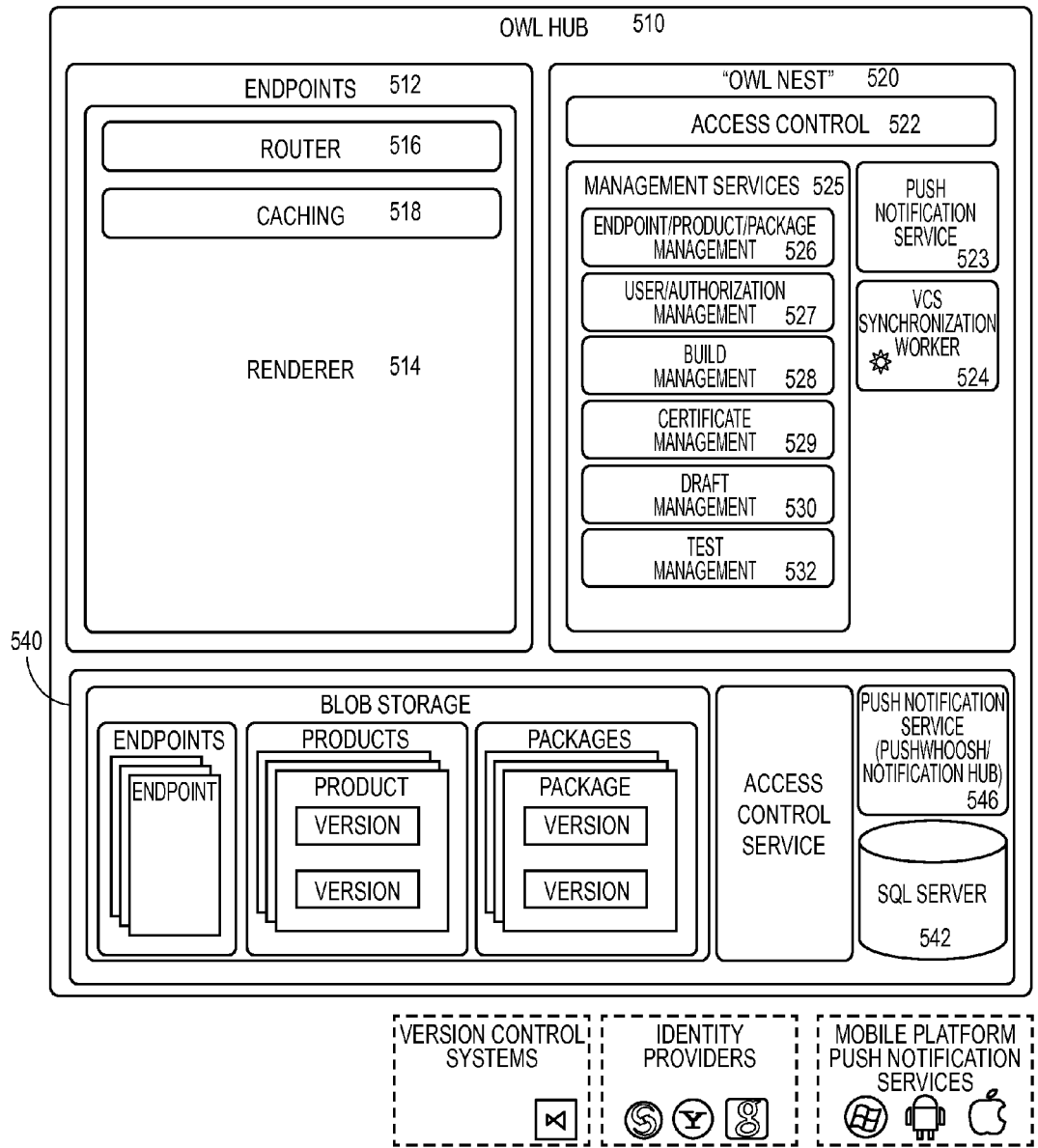
FIG. 5 illustrates a server-side architecture configuration.

Turning now to FIG. 5, there is illustrated a block diagram depicting a server configured in accordance with the machine-readable instructions stored on the memory device 212. The server configuration is referred to generally as Hub 510. The Hub 510 contains several sub-components including Endpoints 512, Nest 520, and storage component 540.

Endpoints 512 are discoverable nodes of communication that provide an interface to clients to deliver application products developed by the system. Endpoints 512 facilitate a layer of abstraction between the client and the server-side components described herein so that the various server-side components may communicate with one another to deliver an appropriately configured product to each client through the same outward-facing Endpoint 512. Clients may locate an endpoint using a domain name server (DNS) and path or by using a URL with an endpoint ID. Locating an endpoint using DNS and path provides flexibility as the developer may publish one endpoint referred to by textual domain name that can then be redirected to any number of endpoints by editing the associated DNS entry. If the developer does not wish to use DNS, then a URL with an endpoint ID may be provided to the clients.

Once the client has located an endpoint according to the methods described above, Renderer 514 delivers the requested product, and may utilize Router 516 and Caching feature 518. Router 516 is capable of redirecting the endpoint request to any URL or to another endpoint based on information collected about the client based on the client's endpoint request. For example, the Router may examine the User-agent header field on the client's HTTP request to determine the type of hardware or browser type and version in use by the client. Router 516 may then act on this information by redirecting the request to an endpoint customized with a UI, for example, which is optimized for display on that client's particular device. Examples of redirections based on the client's User-agent may be to a mobile or desktop version of the requested product. Caching feature 518 determines if a requested endpoint was modified since the client's last request, for example if the client performs a conditional GET request, and may return HTTP code 304 instead of re-serving the non-modified product.

Turning now to Nest 520, also depicted in FIG. 5, there are provided multiple services associated with the system, including Access Control module 522, Push Notification service 523, Version Control System (VCS) Synchronization Worker 524, and a cluster of Management Services 525. Management Services 525 contain Endpoint/Product/Package management component 526, User/Authorization management 527, Build Management 528, Certificate Management 529, Draft Management module 530, and Test Management module 532.

Access control module 522 may interface with third-party identity providers such as those provided by Yahoo!, Inc. or Google, Inc., to authenticate users' identity based on their credentials registered in advance with that third party. Push Notification Service 523 likewise may interface with third-party platforms for distribution of messages to mobile devices such as those provided by Microsoft, Inc., Google, Inc., and Apple, Inc. VCS Synchronization Worker 524 may provide integration with a source code control database, for instance, Team Foundation Server published by Microsoft Corp. The VCS Sync integrates Nest 520 with the source code control database by associating a draft endpoint and service URL as targets of the source code control database. VCS Worker 520 in this manner has access to information from the source code control DB such as latest check-in, path information, and build targets. This configuration allows for changes in the source code control DB made locally to be reflected virtually instantly in the cloud storage that hosts the products and packages (as discussed in more detail below), and thus available to requesting clients.

Management Services 525 contains several components capable of integrating the building, versioning, and distribution of products developed in the system such that individual product builds are treated as immutable deliveries that are preserved independently from future versions of the product. In this way, the Management Services 525 provide a benefit of the invention by allowing users to continue to use a particular version of a product without the need to perform regression testing as new components are added or modified. As development progresses on a product, the prior versions may still be served and still work with the product for which they were originally created.

One part of Management Services 525 is the Endpoint/Product/Package management component 526, which is capable to gather the necessary resources, as described above, needed by an application in response to a client request to an Endpoint 512 by reading macros specified in the endpoint and substituting them in the application configuration. Endpoint/Product/Package Management component 526 then may find the requested product version's configuration and related static resources such as images, mark-up language files, cascading style sheets, as similar resources. It may also retrieve related JavaScript files for each UI component in the requested product, and combine all such files into a single, preferably minified and compressed, file, and preferably configured for use with a content distribution network such as, for example, Azure or Akamai. Finally, Endpoint/Product/Package Management component 526 returns back a mark-up language file with a link to the single JavaScript file, a link to the CSS, and then an auto-loaded script may call the system application component, passing the application configuration as a parameter.

Cloud storage component 540, also depicted in FIG. 5, represents several services related to storage of data needed to deliver products via the Endpoints 512. Cloud storage component 540 may be any type of cloud storage, but, for purposes of illustration, Azure Blob Storage is shown in this example. The Cloud Storage 540 hosts a catalogue of versions of previously published products, any of which may be associated with an endpoint 512. Cloud Storage 540 also hosts an array of packages of components, organized by version number, that may be associated with any of the products. In this way, the delivery of immutable products is accomplished via cloud storage because any version of a product has access to any needed packages of the version for which it was written. Finally, Cloud Storage 540 contains SQL server 542 for storage of product data and Access Control Service 544 and Push Notification Service 546 for accessibility to the products stored in the cloud.

Figure 6:
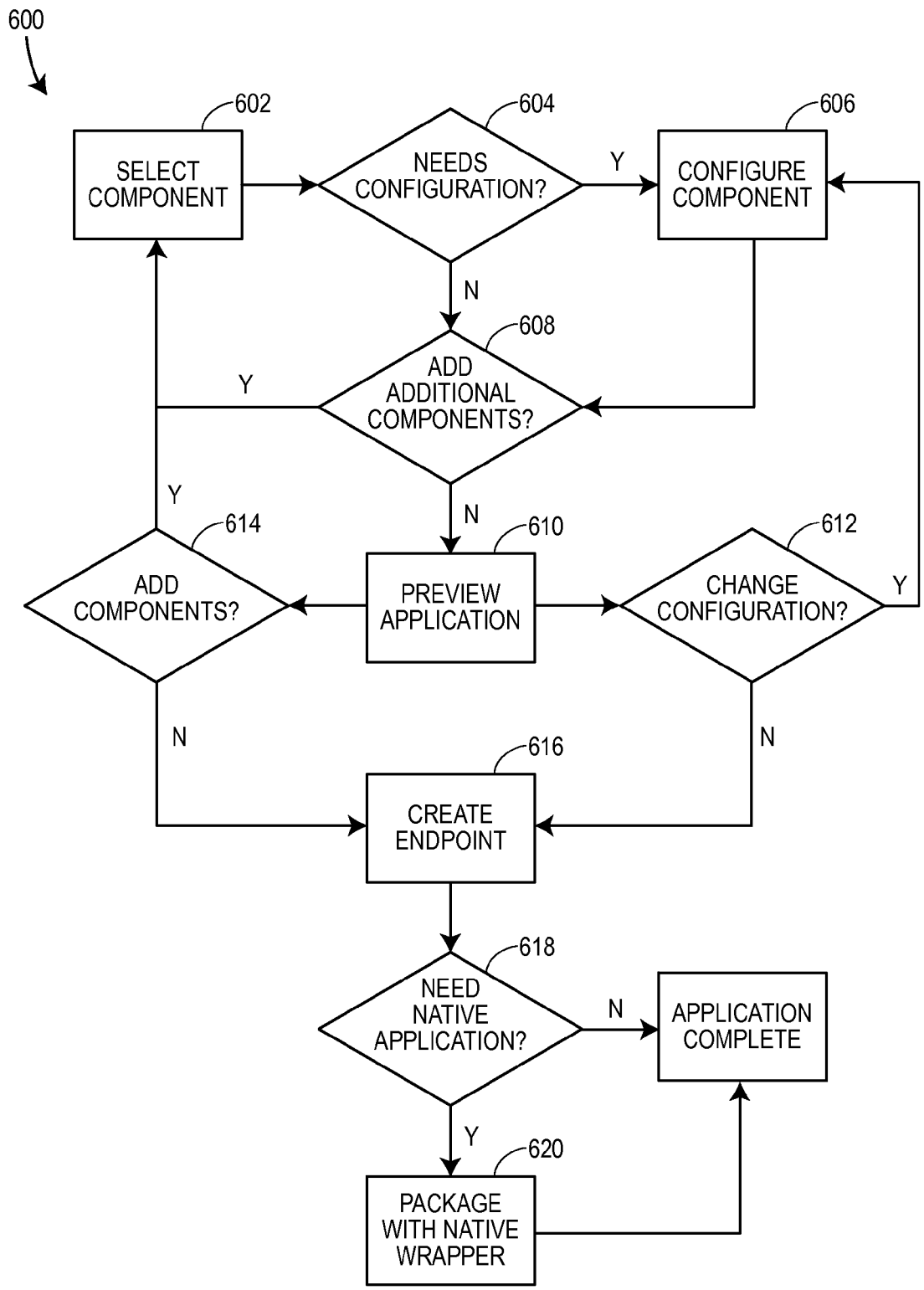
FIG. 6 is a flow chart depicting an exemplary method for creating an application using the described development platform.

FIG. 6 is a flow chart illustrating an exemplary method 600 for creating an application using the application development platform 100 of FIG. 1, in accordance with another example. While the method 600 illustrates a device-independent embodiment of the method, and is neither server or client oriented, the counterpart server- or client-specific methods will be readily understood from the method 600. An application developer, using the software development module 118, selects a component 120 (or a package of components) from the database 114 (block 602) and adds the component 120 to the application (e.g, by dragging and dropping the component into a workspace, such as a product workspace, associated with the application). The server 102 and, specifically, the software development module 118 operating on the server 102, receives data indicating that the selected component was added to the application. The component 120 may be a functional component or a user-interface component. Moreover, the component 120 may be pre-configured (i.e., a configured component requiring no configuration to function as intended) or may require configuration. If the component 120 requires configuration (block 604) the application developer may use the software development module 118 to configure the component 120, supplying any necessary parameter values (e.g., object paths, user-interface size, etc.) (block 606). In any event, if the application developer needs to add additional components to the application (block 608), the application developer can repeat the portion of the method (blocks 602-606) for selecting, adding and configuring components.

If no more components need to be added to the application (block 608), the application developer can preview the application using the software development module 118 (block 610). If the application developer, upon previewing the application, decides that the configuration of one or more of the components 122 needs to be changed (block 612), then the method returns to configuration (block 606). Alternatively or additionally, if the application developer decides that additional components 122 are required or desired (block 614), then additional components may be selected (block 602).

When the application developer is satisfied from the application preview (block 610) that no further components are required or desired (block 614) and that no additional component configuration is necessary or desired (block 612), the application developer creates an endpoint application instantiation 124 (block 616). If the application is going to be distributed as a native application for use on a device (block 618), the application can be packaged with a native wrapper (e.g., for iOS, Android, etc.) (block 620).

Figure 7:
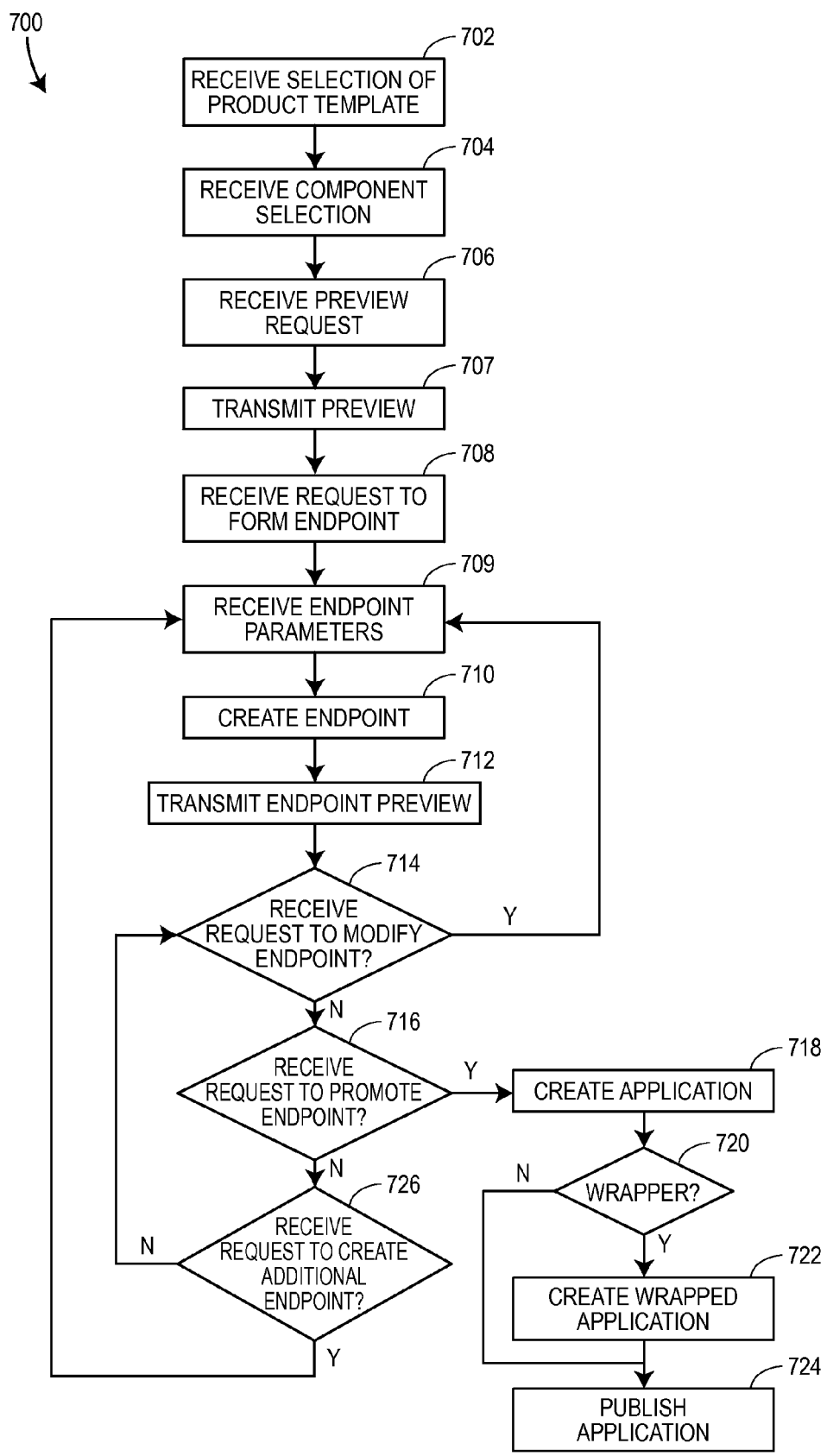
FIG. 7 is a flow chart depicting an exemplary method for creating from a product template an application with multiple elements using the described development platform.

FIG. 7 is a flow chart illustrating an exemplary method 700 for creating from a product template an application with multiple endpoints using the distribution platform 100. The method 700 is implemented by the server 102, for example. The application developer instantiates or accesses the software development module 112 on the server 102. In some embodiments, the application developer accesses the software development module 112 via a web browser operating on the computing device that the application developer is using, which may be, for example, the developer computer 106. The server 102 may, via the server software 116 executed by the processor 110, make available to the developer computers 106, via the network 104, a web-interface to the software developer module 118 (also executed by the processor 110).

The application developer may select a product template from which to start creating the application. The server 102 receives the selection of the product template (block 702) and, in embodiments, displays to the application developer a workspace associated with the selected product template. Presented with the workspace, the application developer has the option of selecting components to add to the product template. The selection of components is, in various embodiments, accomplished by means of a drag-and-drop operation performed by the application developer. The server 102 receives the selected component(s) (block 704) and, in the background, associates with the selected product template source code instructions corresponding to the selected components. As described with reference to FIG. 6, the application developer has the option of configuring the selected components. That is, the server 102 may receive from the developer computer 106 a request for a configuration screen that allows the developer to configure one or more of the selected components. In response to the request, the server 102 may transmit a component configuration display to the developer computer 106 and, accordingly, receive configuration information transmitted to the server 102 from the developer computer 106.

When the application developer is done adding components to the product template (or when the application developer merely desires to see a preview of the product) the application developer can send to the server 102 a request to preview the product. The server 102 receives the preview request (block 706) and transmits to the developer computer 106 a preview of the populated product template (block 706) for display to the application developer. In some embodiments, receiving the preview request may include receiving from the developer computer 106 an indication of how to format the preview. For example, preview request may include an indication that the preview should be formatted as a web page, as a tablet, as a smart phone, etc., and the server 102 may transmit a preview according to the indication. Additionally, the preview request may include, for some formats, an indication as to whether the preview should be formatted in portrait mode or landscape mode, and the server 102 may transmit a preview according to the indication. In some embodiments, the server 102 receives the preview request, and transmits a preview that includes controls, displayed to the application developer on the developer computer 106, that allow the application developer to format the preview according to the developer's desires. In some embodiments, the preview request may also include an indication of an endpoint 124 stored in the database 114 to use to provide the preview.

If the application developer determines that the product is complete (e.g., that the developer does not want to add any additional components and/or perform any additional configuration), the developer may transmit a request to form an endpoint application instantiation 124. The request to form the endpoint may include, in some embodiments, parameters such as the type of endpoint to form, the products to associate with the endpoint, one or more paths to necessary modules or data associated with the endpoint, and the like. In any event, the request and any associated data/parameters are received at the server 102 (block 708). In response to the request to form the endpoint, the server 102 may receive endpoint parameters (block 709), form the selected/requested endpoint (block 710) and, in some embodiments, may transmit to the developer computer 106 a preview of the endpoint for display (block 712). If the application developer decides that the endpoint requires modification, the developer, through the developer computer 106, may transmit to the server 102 a request to modify the endpoint. If the server 102 receives a request to modify the endpoint (block 714), the server 102 may again receive endpoint parameters (block 709) and may await a command to form the endpoint (block 708) or to select additional components or configure (or re-configure) existing components (block 704).

Alternately, if the server 102 does not receive a request to modify the endpoint (block 714), the server may await a command to associate the endpoint. In any event, if the server 102 does not receive a request to associate the endpoint, the server 102 may await a request to create additional endpoints (block 726). If the server 102 receives a request to create an additional endpoint, the server may also receive a selection of a next endpoint to create and/or receive parameters for creating the additional endpoint (block 709), and control may return to a routine for forming the selected endpoint (block 710). On the other hand, if the server 102 receives a request to associate the endpoint (block 716), the server 102 may create an application according to the endpoint and the product (block 718). After creating the application, the server 102 may determine whether a wrapper is required (block 720). The server 102 may determine whether a wrapper is needed by, for example, transmitting to the developer computer 106 a query and awaiting a response to the query. In another embodiment, the server 102 determines that no wrapper is required unless the server 102 receives from the developer computer 106 a request for a wrapper. If the server 102 receives a request to wrap the application, which request may include an indication of the type of wrapper to provide (e.g., the mobile operating system for which to create a native application) the server 102 may create a wrapped application (block 722) suitable for installation to a corresponding device type. Once the server 102 has created the wrapped application (block 722), or if no wrapper is needed (e.g., no request to wrap the application is received), the server 102 may publish the application (block 724). In some embodiments, the server 102 receives a command to publish the application, while in other embodiments, the server 102 may publish the application automatically. In some embodiments, the server 102 publishes the application according to stored parameters or according to parameters received from the developer computer 106.

Figure 8:
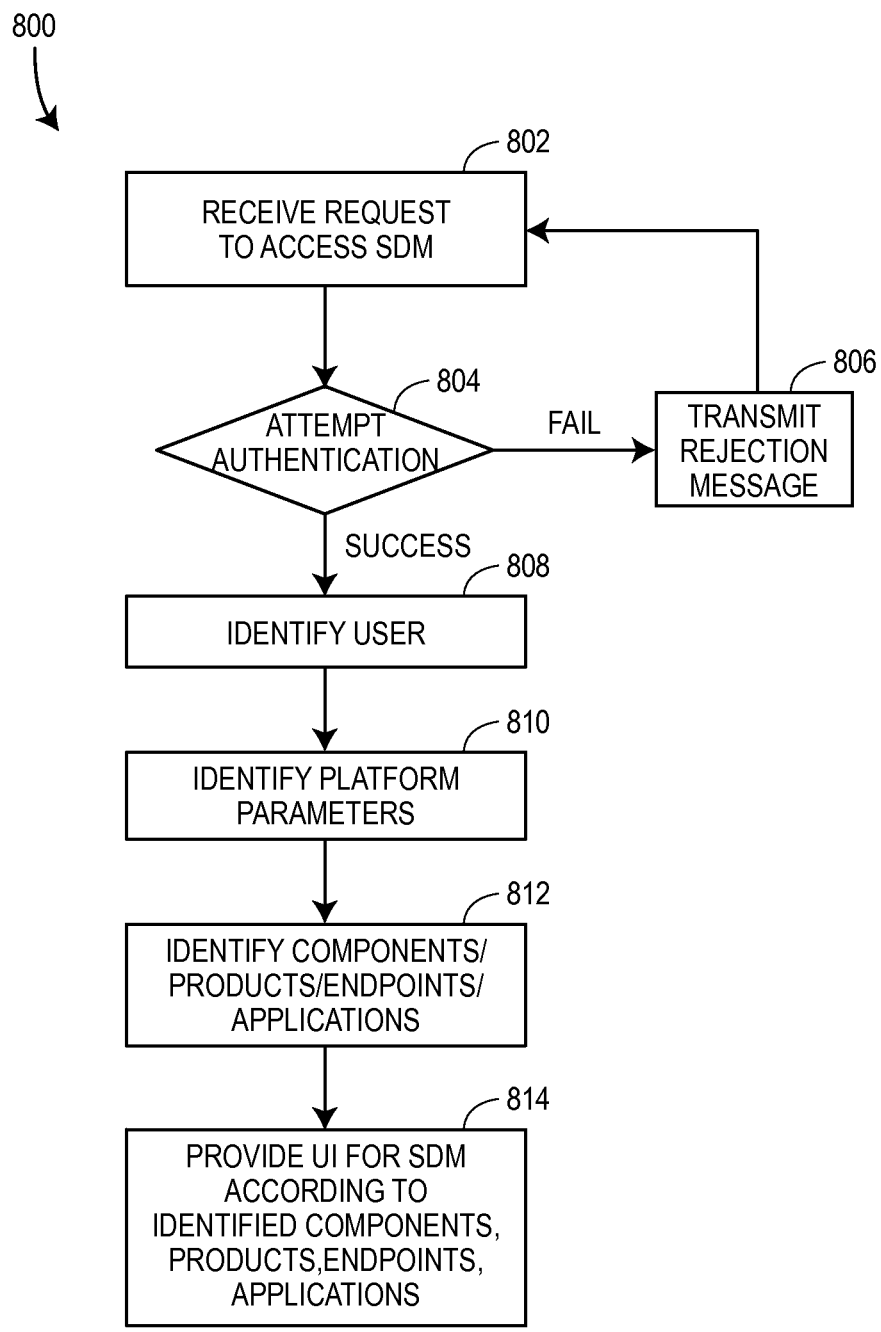
FIG. 8 is a flow chart depicting an exemplary method for customizing, according to a user or class of users, an interface of the application development platform.

FIG. 8 is a flow chart illustrating an exemplary method 800 for customizing, according to a user or class of users, an interface of the application development platform 100. For example, an application developer may be a product manager, working for the operator of the distribution platform 100, developing, updating, or distributing software applications to customers. Alternatively, an application developer may be an employee of a customer of the distribution platform 100, using the platform 100 to develop, update, and/or distribute applications. In embodiments, the distribution platform 100 is operable to determine one or more parameters of the application developer, such as a project the application developer is working on, a project the developer is associated with, an identification associated with the developer, etc., and to tailor the interface of the software development module 118 according to the one or more parameters. In this manner, the platform 100 may present to the developer a specific and/or customized development environment specific to the developer, to the project the developer is working on, to the permissions associated with the developer, etc. As one example, the platform 100 may determine a user ID of the developer and, according to user-specific permissions and/or preferences, or according to permissions and/or preferences associated with a customer associated with the user, may provide access to a specific set or sub-set of information stored in the database 114. For instance, the platform 100 may: provide access to template products 122 to which the user or customer has subscribed; provide access to products 122 created by the user or customer; provide access to applications created by the user or customer; may provide access to components 120 and/or endpoints 124 that the user or customer has created and/or to which the user or customer has subscribed; may provide components 120, template products 122, and endpoints 124, customized to correspond to a style, theme, or configuration associated with the user or customer; may set preferences and/or file paths in the software development module 118 according to the user or customer; etc.

In accordance with the method 800, the server 102 receives a request from a developer computer 106 to access the software development module 118 (block 802). The server 102 may attempt to authenticate the developer computer 106 (or the user of the developer computer 106) by, for example, requesting authentication credentials such as a user name and password. If the server 102 is unsuccessful in authenticating the developer computer 106 (or the associated user) (block 804), the server 102 transmits a rejection message indicating the authentication failed (block 806). Alternately, if the server 102 successfully authenticates the developer computer 106 (or associated user) (block 804), the server 102 identifies the user or customer (block 808) according to, for example, data stored in the database 114. The server 102 may also identify various parameters of the platform 100 that are associated with the user or customer (block 810) such as: default directory path parameters, default color schemes or themes, development functions for which the user or customer has subscribed or otherwise has permission to operate; default user interface control types associated with the user or customer; software development module interface options stored for the user or customer; etc. Further, the server 102 may identify customer- or user-specific components 120, products 122, endpoints 124, and/or applications 126 (block 812). The server 102 may then provide to the developer a user interface for the software development module 118 according to the identified parameters and components (block 814).

Figure 9:
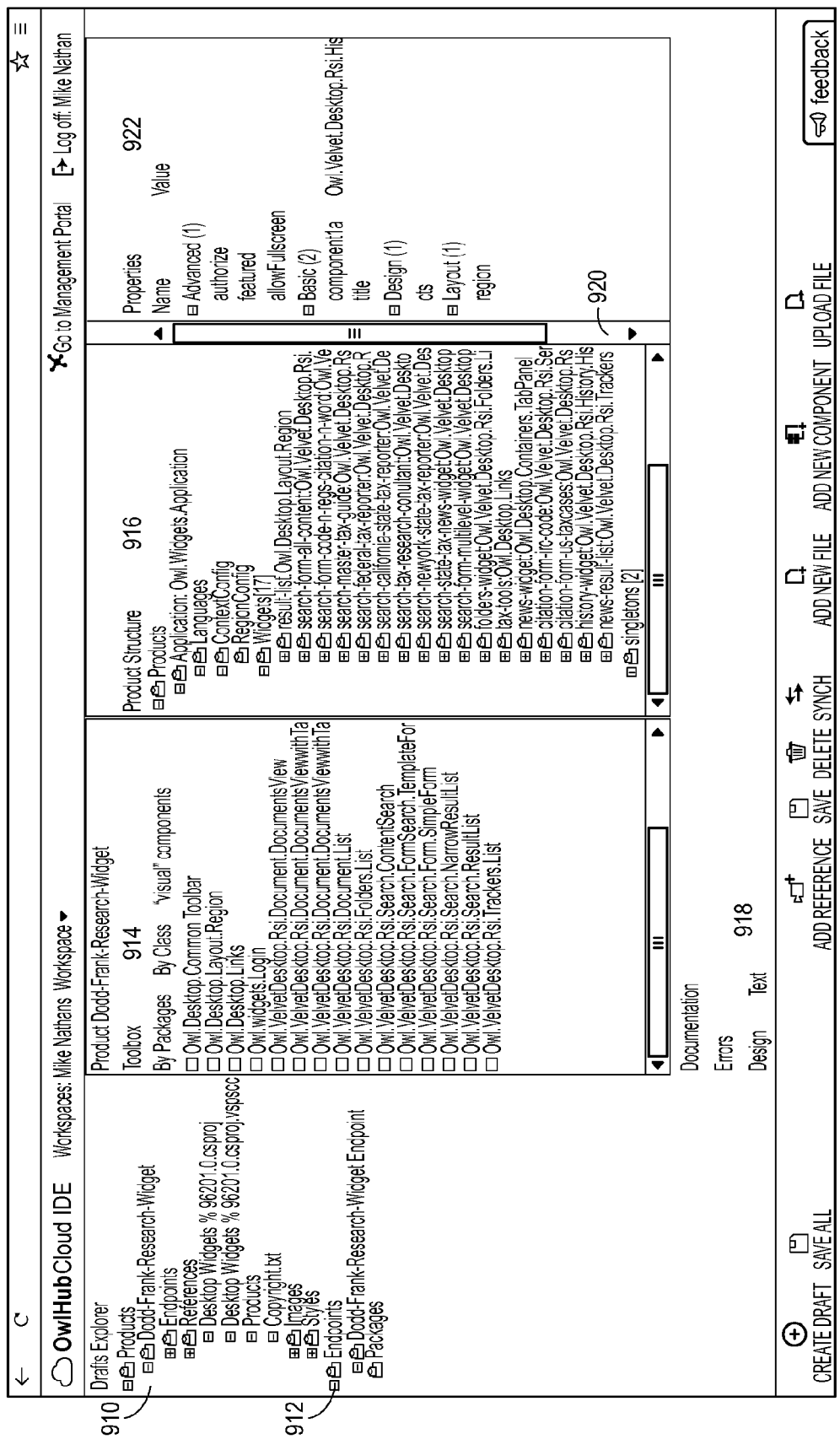
FIG. 9 illustrates a developer interface for creating or modifying components of a software product.

FIG. 9 depicts a developer user interface browser for creating and testing components in a draft product. Upon creation of a new product, the IDE accepts a name 910 for a the draft product, which may optionally be created based on a template, and a selected associated endpoint 912. The IDE provides a Toolbox 914 for browsing and modifying components associated with the new product. The toolbox has multiple views or filters for browsing component templates, such as by package, class, or visual components. A developer may add a selected component to a product using the Add Reference button 918. Product Structure view 916 provides an interface for browsing and editing the properties of components selected for inclusion in a product. As illustrated in FIG. 9, a history-widget component 920 has been selected, which reveals its properties in Properties window 922. A developer may modify the properties by selecting the appropriate field in Properties window 922 to configure the component as desired. As described above, this interface allows a developer to handle and configure the components without resort to modification of, or even awareness of, the underlying source.

Figure 10:
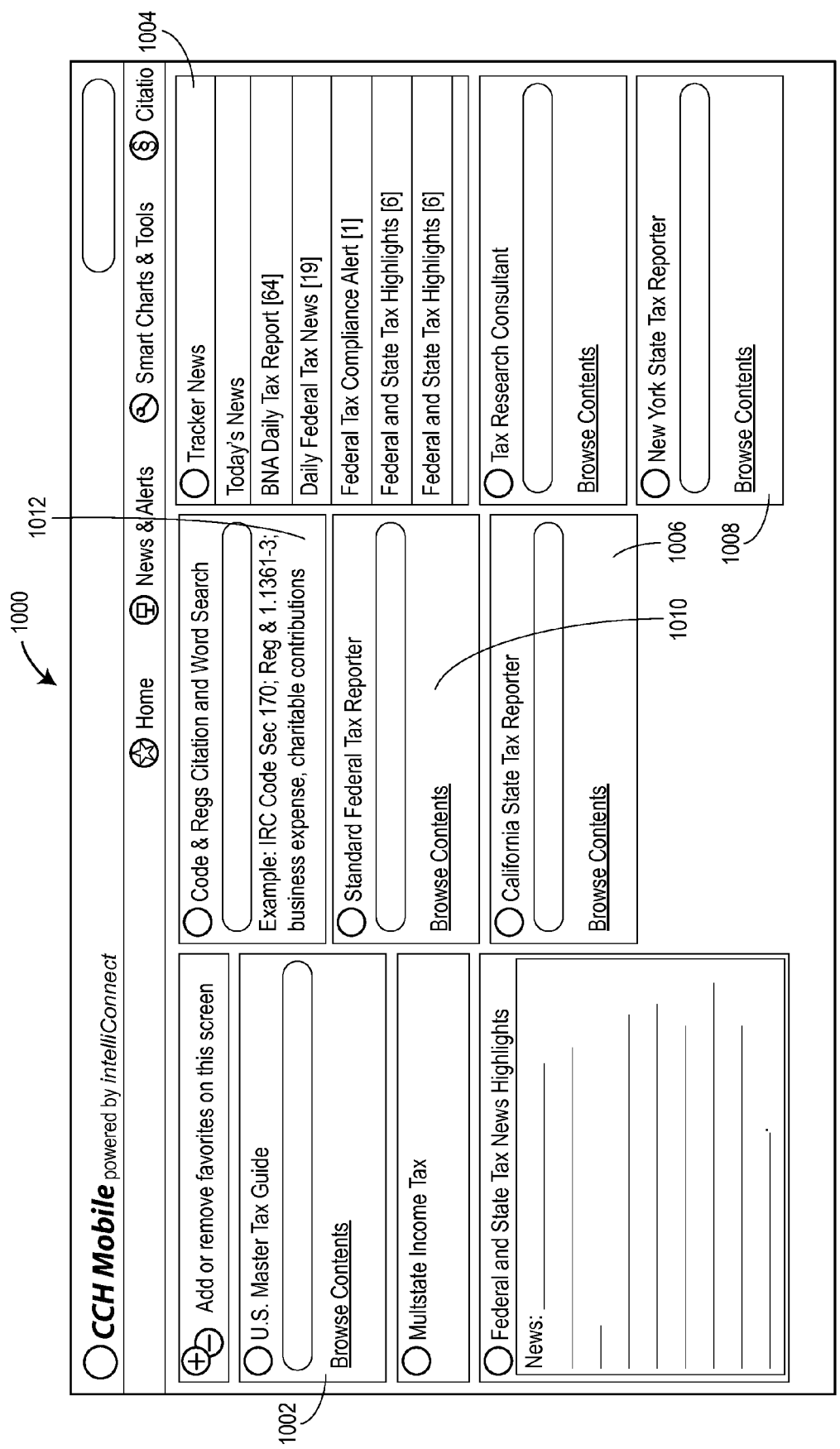
FIG. 10 is a screen shot of an example client-facing application

FIG. 10 is an example product 1000. The product includes a variety of user-interface components some or all of which may be associated with functional components. For example, a component 1002 provides a user-interface for entering a search string. The component 1002 may be associated with a functional component that receives the search string via the component 1002 and searches a U.S. Master Tax Guide database. Similarly, a user-interface component 1004 may provide a listing of news items. The component 1004 may be associated with a functional component that searches for and provides the news items for display in the component 1004. Each of the components may be individually added to the product, and may be individually customized for the particular product. For example, two user interface components 1006 and 1008 may both be a same user-interface component, but may be customized differently to be titled "California State Tax Reporter" and "New York State Tax Reporter," respectively. Each may be associated with a corresponding functional component which may likewise be a same component customized to search different databases (e.g., a California Tax Reporter database and a New York Tax Reporter database, respectively). Additionally, various components maybe grouped together into packages. For example, the components 1006, 1010, and 1012, may be part of a "tax package" put together under the assumption that a developer programming a UI that includes a State Tax Reporter component (e.g., the California State Tax Reporter component 1006) would also likely include a Federal Tax Reporter component (e.g., the Standard Federal Tax Reporter component 1010). Additionally, each of the user interface components 1006, 1010, and 1012, may be in a package with its associated functional component.

Figure 12:
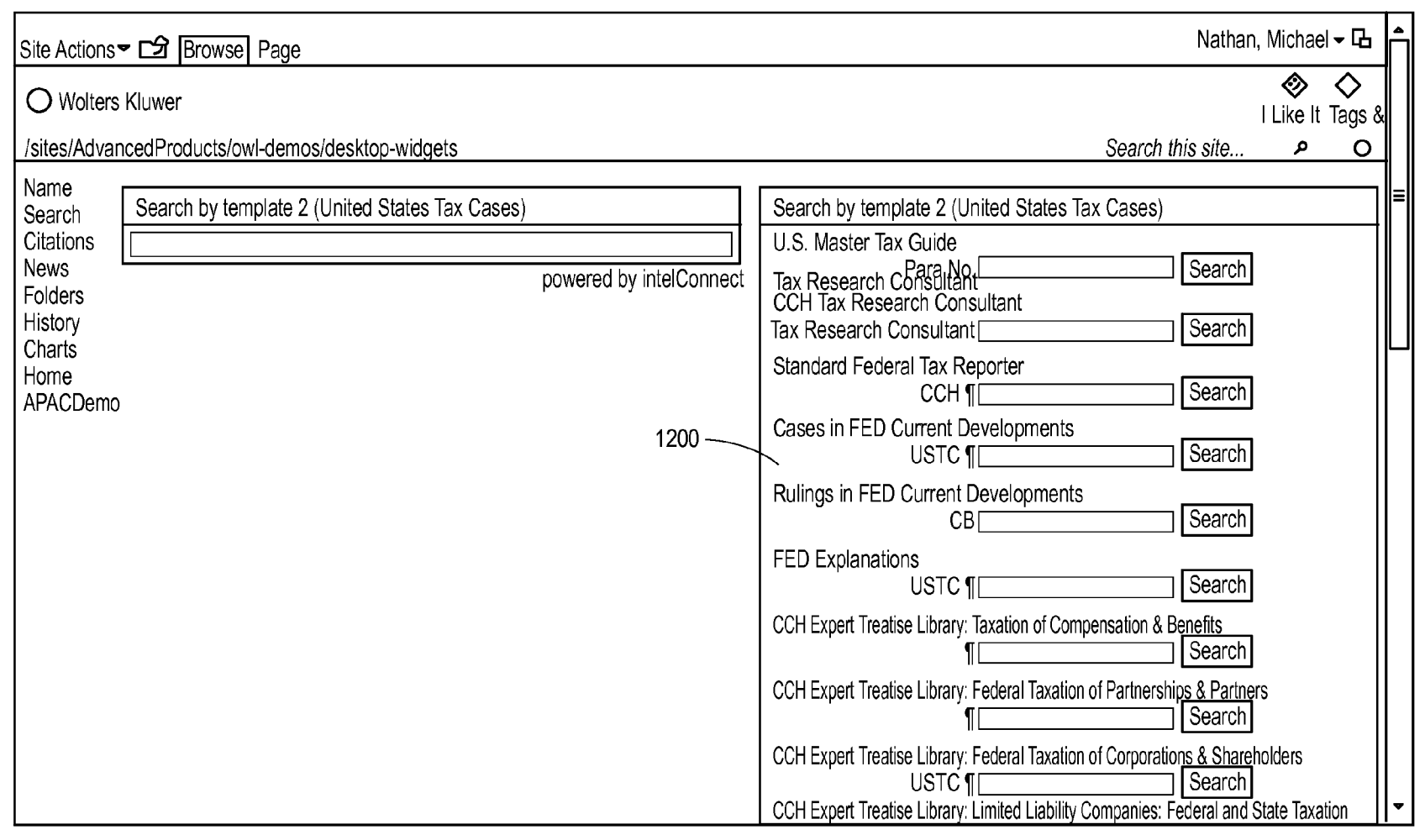

FIGS. 11 and 12 are each additional example products that may be programmed using the platform described herein. FIG. 11 is a navigator application that allows a user to navigate a text resource. A user interface component on the left allows the user to navigate chapters of the text resource, while a user interface component on the right allows the user to read the text of the selected chapter of the text resource. With regard to FIG. 12, specifically, some of the user-interface components may have associated with them the same functional components as the user interface components in FIG. 10. For example, though implementing a different user interface component, a component 1200 is nevertheless associated with the same functional component as the user-interface component 1010 of FIG. 10. That is, both the user-interface component 1010 of FIG. 10 and the user-interface component 1200 of FIG. 12 are associated with a functional component that receives a search query input and searches the Standard Federal Tax Reporter.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" or "an example" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A software development and distribution platform, hosted on a server and comprising:
   a processor;
   a library of configurable user interface components and functional components; and
   an application hub hosting a developer interface accessible by an application developer via a network, the developer interface allowing the application developer to:
   select, by the processor, of one or more components from the library for inclusion in a product;
   configure, by the processor, each of the user interface components and functional components in the product;
   display, by the processor, a preliminary occurrence of the product, wherein the preliminary occurrence of the product is a real-time preview of the product that provides the developer a visual indication of the changes made; and
   associate, by the processor, the product with any of a plurality of endpoints;
   wherein the application hub is further operable to receive from the application developer a request for the product, and to provide the product to the application developer according to any one or more of the plurality of endpoints, according to an endpoint request received from the application developer; and
   wherein the application hub is further operable to allow the application developer to promote the preliminary occurrence of the product as multiple endpoint applications.

2. The software development and distribution platform of claim 1, wherein the multiple endpoint applications comprise at least some endpoint applications that differ in theme, branding, color patterning, language, or a combination thereof.

3. The software development and distribution platform of claim 1, the multiple endpoint applications comprise at least two endpoint applications targeted for use on different mobile operating systems.

4. The software development and distribution platform of claim 1, wherein the application hub is further operable to publish an application endpoint to an application distribution manager.

5. The software development and distribution platform of claim 1, wherein the application hub is further operable to wrap an endpoint application for distribution to clients.

6. The software development and distribution platform of claim 1, wherein the application hub is further operable to wrap an endpoint application for distribution to a mobile application marketplace.

7. The software development and distribution platform of claim 1, wherein the endpoint comprises a routing endpoint.

8. The software development and distribution platform of claim 7, wherein the routing endpoint routes a client request to an application endpoint.

9. The software development and distribution platform of claim 7, wherein the routing endpoint routes a client request to an application endpoint based on user-agent information contained in the client request.

10. The software development and distribution platform of claim 1, wherein the visual indication of changes made includes changes to one component that affect another component within the product.

11. A method comprising:
    storing on a server a library of configurable user interface components and functional components;
    providing, via the server, an application hub hosting a developer interface accessible by an application developer via a network;
    receiving, via the developer interface, a selection of one or more components from the library, the components selected for inclusion in a product;
    receiving configuration data for one or more of the selected components;
    displaying, via the developer interface, a preliminary occurrence of the product, wherein the preliminary occurrence of the product is a real-time preview of the product that provides the developer a visual indication of the changes made;
    associating the product with any of a plurality of endpoints;
    receiving from an application developer a request for the product;
    providing the product to the application developer according to any one or more of the plurality of endpoints, according to an endpoint request received from the application developer; and
    selectively promoting the preliminary occurrence of the product as multiple endpoint applications.

12. The method of claim 11, wherein promoting the preliminary occurrence of the product as multiple endpoint applications comprises promoting the preliminary occurrence of the product as multiple endpoint applications that differ in theme, branding, color patterning, language, or a combination thereof.

13. The method of claim 11, wherein promoting the preliminary occurrence of the product as multiple endpoint applications comprises promoting the preliminary occurrence of the product as multiple endpoint applications targeted for use on different mobile operating systems.

14. The method of claim 11, further comprising publishing an endpoint application to an application distribution manager.

15. The method of claim 11, further comprising wrapping an endpoint application for distribution to clients.

16. The method of claim 11, further comprising wrapping an endpoint application for distribution to a mobile application marketplace.

17. The method of claim 11, wherein the endpoint comprises a routing endpoint.

18. The method of claim 17, wherein the routing endpoint routes a client request to an application endpoint.

19. The method of claim 17, wherein the routing endpoint routes a client request to an application endpoint based on user-agent information contained in the client request.

20. The method of claim 11, wherein the visual indication of changes made includes changes to one component that affect another component within the product.

21. A non-transitory computer-readable storage medium storing instructions in a memory, executable by a processor, the instructions operable to cause the processor to:
   retrieve one or more components from a library of configurable user interface components and functional components;
   provide to an application developer, via a network, a developer interface;
   receive, via the developer interface, a selection of one or more components from the library, the components selected for inclusion in a product;
   receive configuration data for one or more of the selected components;
   display, via the developer interface, a preliminary occurrence of the product, wherein the preliminary occurrence of the product is a real-time preview of the product that provides the developer a visual indication of the changes made;
   associate the product with any of a plurality of endpoints;
   receive from the application developer a request for the product;
   provide the product to the application developer according to any one or more of the plurality of endpoints, according to an endpoint request received from the application developer; and
   selectively promote the preliminary occurrence of the product as multiple endpoint applications.

22. The computer-readable storage medium of claim 21, wherein the instructions are further operable to cause the processor to promote the preliminary occurrence of the product as multiple endpoint applications that differ in theme, branding, color patterning, language, or a combination thereof.

23. The computer-readable storage medium of claim 21, wherein the instructions are further operable to cause the processor to promote the preliminary occurrence of the product as multiple endpoint applications targeted for use on different mobile operating systems.

24. The computer-readable storage medium of claim 21, wherein the instructions are further operable to cause the processor to publish an endpoint application to an application distribution manager.

25. The computer-readable storage medium of claim 21, wherein the instructions are further operable to cause the processor to wrap an endpoint application for distribution to clients.

26. The computer-readable storage medium of claim 21, wherein the instructions are further operable to cause the processor to wrap an endpoint application for distribution to a mobile application marketplace.

27. The computer-readable storage medium of claim 21, wherein the endpoint comprises a routing endpoint.

28. The computer-readable storage medium of claim 27, wherein the routing endpoint routes a client request to an application endpoint.

29. The computer-readable storage medium of claim 27, wherein the routing endpoint routes a client request to an application endpoint based on user-agent information contained in the client request.

30. The computer-readable storage medium of claim 21, wherein the visual indication of changes made includes changes to one component that affect another component within the product.

* * * * *